United States Patent
Rama Chandran

(10) Patent No.: US 10,791,527 B2
(45) Date of Patent: Sep. 29, 2020

(54) APPARATUS FOR SIGNALING OF CONTROL MESSAGES FOR FRONTHAUL INTERFACE

(71) Applicant: Samsung Electronics Co., Ltd., Suwon-si, Gyeonggi-do (KR)

(72) Inventor: Sanil Rama Chandran, McKinney, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/599,939

(22) Filed: Oct. 11, 2019

(65) Prior Publication Data
US 2020/0128496 A1 Apr. 23, 2020

Related U.S. Application Data

(60) Provisional application No. 62/746,795, filed on Oct. 17, 2018.

(51) Int. Cl.
*H04W 52/52* (2009.01)
*H04W 72/04* (2009.01)
(Continued)

(52) U.S. Cl.
CPC .......... *H04W 52/52* (2013.01); *H04W 52/06* (2013.01); *H04W 52/60* (2013.01); *H04W 72/0406* (2013.01)

(58) Field of Classification Search
CPC ..... H04W 52/06; H04W 52/52; H04W 52/60; H04W 72/0406
(Continued)

(56) References Cited

U.S. PATENT DOCUMENTS 9,413,509 B2 * 8/2016 Chen ................. H04W 28/06
2013/0223391 A1 * 8/2013 Koo ................. H04W 72/1215
370/329
(Continued)

FOREIGN PATENT DOCUMENTS

WO 2018/093301 A1 5/2018

OTHER PUBLICATIONS

"XRAN Fronthaul Working Group Control, User and Synchronization Plane Specification", XRAN-FH.CUS.0-v02.01, Apr. 2018, 183 pages.
(Continued)

*Primary Examiner* — Tan H Trinh

(57) ABSTRACT

A transmitter device in a wireless communication system is provided. The transmitter device comprises a processor configured to: generate an extType field indicating a section extension; generate a mcScaleReMask field indicating a set of resource elements; generate a mcScaleOffset field indicating a power offset value; generate an extLen field indicating a number of a pair of the mcScaleReMask and the mcScaleOffset fields included in the section extension; and generate a downlink and uplink (DL/UL) control message including the extType field, the mcScaleReMask field, and the mcScaleOffset field, and the extLen field. The transmitter device further comprises a transceiver operably connected to the processor, the transceiver configured to transmit, to a receiver, the DL/UL control message.

20 Claims, 14 Drawing Sheets

(51) Int. Cl.
*H04W 52/06* (2009.01)
*H04W 52/60* (2009.01)

(58) Field of Classification Search
USPC .......... 455/69, 434, 450, 522; 370/315, 329
See application file for complete search history.

(56) References Cited

U.S. PATENT DOCUMENTS

| | | | | |
|---|---|---|---|---|
| 2014/0031036 | A1* | 1/2014 | Koo | H04W 36/20 |
| | | | | 455/434 |
| 2014/0233454 | A1* | 8/2014 | Speight | H04B 7/15542 |
| | | | | 370/315 |
| 2016/0128053 | A1* | 5/2016 | Wei | H04W 72/048 |
| | | | | 455/450 |
| 2018/0054772 | A1 | 2/2018 | Tan | |
| 2018/0139634 | A1 | 5/2018 | Zhu et al. | |
| 2018/0146491 | A1* | 5/2018 | Kim | H04W 28/0268 |
| 2018/0254846 | A1 | 9/2018 | Choi et al. | |
| 2018/0332602 | A1* | 11/2018 | Lee | H04W 72/02 |
| 2018/0367278 | A1* | 12/2018 | Chatterjee | H04L 1/1858 |
| 2019/0208482 | A1* | 7/2019 | Tooher | H04L 27/2628 |
| 2019/0356427 | A1* | 11/2019 | Babaei | H04L 1/1812 |
| 2020/0137735 | A1* | 4/2020 | Wang | H04L 5/0094 |

OTHER PUBLICATIONS

"O-RAN Fronthaul Working Group Control, User and Synchronization Plane Specification", ORAN-WG4.CUS.0. v01-00, Apr. 2018, 186 pages.

XRAN, "xRAN Fronthaul Working Group, Control, User and Synchronization Plane Specification", XRAN-FH.CUS.0-v01.00, Technical Specification, Apr. 4, 2018, 61 pages.

Notification of Transmittal of the International Search Report and the Written Opinion of the International Searching Authority, or the Declaration dated Jan. 22, 2020 in connection with International Patent Application No. PCT/KR2019/013629, 9 pages.

* cited by examiner

| Section Type 1 : DL/UL control msgs | | | | | | | | # of bytes | |
|---|---|---|---|---|---|---|---|---|---|
| 0 (msb) | 1 | 2 | 3 | 4 | 5 | 6 | 7 (lsb) | | |
| transport header ||||||||  8 | Octet 1 |
| dataDirection | payloadVersion ||| filterIndex ||||  1 | Octet 9 |
| frameId ||||||||  1 | Octet 10 |
| subframeId |||| slotId ||||  1 | Octet 11 |
| slotId ||| startSymbolId |||||  1 | Octet 12 |
| numberOfSections ||||||||  1 | Octet 13 |
| sectionType ||||||||  1 | Octet 14 |
| udCompHdr ||||||||  1 | Octet 15 |
| reserved ||||||||  1 | Octet 16 |
| sectionId ||||||||  1 | Octet 17 |
| sectionId ||| rb | symInc | startPrbc |||  1 | Octet 18 |
| startPrbc ||||||||  1 | Octet 19 |
| numPrbc ||||||||  1 | Octet 20 |
| reMask ||||||||  1 | Octet 21 |
| reMask |||| numSymbol ||||  1 | Octet 22 |
| ef | beamId |||||||  1 | Octet 23 |
| beamId ||||||||  1 | Octet 24 |
| <section extensions if any> ||||||||  0-var | |
| ... ||||||||  | |

FIG. 4A

| ef | extType | | | 1 | Octet x |
|---|---|---|---|---|---|
| | extLen | | | 1 | Octet x+1 |
| | pwrScaleReMask[11:4] | | | 1 | Octet x+2 |
| pwrScaleReMask[3:0] | | csf | pwrScaleOffset[10:8] | 1 | Octet x+3 |
| | pwrScaleOffset[7:0] | | | 1 | Octet x+4 |
| | pwrScaleReMask[11:4] | | | 1 | Octet x+5 |
| pwrScaleReMask[3:0] | | csf | pwrScaleOffset[10:8] | 1 | Octet x+6 |
| | pwrScaleOffset[7:0] | | | 1 | Octet x+7 |
| zero padding to achieve 4-byte alignment as needed | | | | | |

FIG. 4B

| Channel | Power offset | Modulation |
|---|---|---|
| PDSCH | -15dB ~ 16dB, 1dB resolution | QPSK ~ 256QAM |
| DMRS_PDSCH | 0, 3, 4.77dB | QPSK |
| PT-RS | 0, 3, 4.7, 6, 7, 7.78 dB | QPSK |
| CSI-RS | -3, 0, 3, 6 dB | QPSK |
| PDCCH | -24dB ~ 23dB, 0.125dB resolution | QPSK |
| DMRS_PDCCH | -24dB ~ 23dB, 0.125dB resolution | QPSK |
| PSS | 0, 3dB | BPSK |
| SSS | Same power with SS-PBCH | BPSK |
| PBCH | Same power with SS-PBCH | QPSK |

FIG. 6

| No. | Channel Combination | |
|---|---|---|
| 1 | PDSCH + DMRS_PDSCH | (2 channels) |
| 2 | PDSCH + PT-RS | (2 channels) |
| 3 | PDSCH + CSI-RS | (2 channels) |
| 4 | DMRS_PDSCH + CSI-RS | (2 channels) |
| 5 | PDSCH + DMRS_PDSCH + CSI-RS | (3 channels) |
| 6 | PDSCH + PT-RS + CSI-RS | (3 channels) |
| 7 | PDSCH + DMRS_PDCCH | (2 channels) |
| 8 | SSS + PBCH | (2 channels) |

FIG. 7

| Section Type 1 : DL/UL control msgs |||||||||  |
|---|---|---|---|---|---|---|---|---|---|
| 0 (msb) | 1 | 2 | 3 | 4 | 5 | 6 | 7 (lsb) | # of bytes |  |
| transport header |||||||| 8 | Octet 1 |
| dataDir ection | payloadVersion ||| filterIndex |||| 1 | Octet 9 |
| frameId |||||||| 1 | Octet 10 |
| subframeId |||| slotId |||| 1 | Octet 11 |
| slotId ||| startSymbolId ||||| 1 | Octet 12 |
| numberOfSections |||||||| 1 | Octet 13 |
| sectionType |||||||| 1 | Octet 14 |
| udCompHdr |||||||| 1 | Octet 15 |
| reserved |||||||| 1 | Octet 16 |
| sectionId = X |||||||| 1 | Octet 17 |
| sectionId |||| Rb = 0 | symInc = 0 || startPrbc = 0 | 1 | Octet 18 |
| startPrbc |||||||| 1 | Octet 19 |
| numPrbc = 1 |||||||| 1 | Octet 20 |
| reMask = 1111 1111 1111 |||||||| 1 | Octet 21 |
| reMask |||| numSymbol = 1 |||| 1 | Octet 22 |
| ef | beamId = b1 ||||||| 1 | Octet 23 |
| beamId |||||||| 1 | Octet 24 |
| <section extensions if any> |||||||| 0-var |  |
| ... |||||||||  |

FIG. 9A

APPARATUS FOR SIGNALING OF CONTROL MESSAGES FOR FRONTHAUL INTERFACE

CROSS-REFERENCE TO RELATED APPLICATIONS AND CLAIM OF PRIORITY

The present application claims priority to U.S. Provisional Patent Application Ser. No. 62/746,795 filed on Oct. 17, 2018. The content of the above-identified patent documents is incorporated herein by reference.

TECHNICAL FIELD

The present disclosure relates generally to control message design. In particular, the present disclosure relates to signaling of control messages for fronthaul interface.

BACKGROUND

The control signal messaging interface between radio unit and the digital unit of a wireless communication system is related to the x radio access network/o radio access network xRAN/O-RAN fronthaul control, user and synchronization (CUS) plane specification which describes the fronthaul interface messages. Control signaling message groups multiple resources in to one section if they have similar beam properties. Within such grouped resources, there may be resources which have different properties such as power. The conventional schemes restrict the configuration of different properties such as power for those resources.

SUMMARY

Embodiments of the present disclosure provide signaling methods of control messages for fronthaul interface.

In one embodiment, a transmitter device in a wireless communication system is provided. The transmitter device comprises a processor configured to: generate an extType field indicating a section extension; generate a mcScaleReMask field indicating a set of resource elements; generate a mcScaleOffset field indicating a power offset value; generate an extLen field indicating a number of a pair of the mcScaleReMask and the mcScaleOffset fields included in the section extension; and generate a downlink and uplink (DL/UL) control message including the extType field, the mcScaleReMask field, and the mcScaleOffset field, and the extLen field. The transmitter device further comprises a transceiver operably connected to the processor, the transceiver configured to transmit, to a receiver, the DL/UL control message.

In another embodiment, a receiver device in a wireless communication system is provided. The receiver comprises a transceiver configured to receive, from a transmitter, a downlink/uplink (DL/UL) control message DL/UL control message. The receiver device further comprises a processor operably connected to the transceiver, the processor configured to decode the DL/UL control message including an extType field, an mcScaleReMask field, an mcScaleOffset field, and an extLen field. The extType field indicates a section extension. The mcScaleReMask field indicates a set of resource elements. The mcScaleOffset field indicates a power offset value. The extLen field indicates a number of a pair of the mcScaleReMask and the mcScaleOffset fields included in the section extension.

In yet another embodiment, a non-transitory computer-readable medium is provided. The non-transitory computer-readable medium comprising program code, that when executed by at least one processor, causes a transmitter device in a wireless communication system to: generate an extType field indicating a section extension; generate a mcScaleReMask field indicating a set of resource elements; generate a mcSCaleOffset field indicating a power offset value; generate an extLen field indicating a number of a pair of the mcScaleReMask and the mcScaleOffset fields included in the section extension; generate a downlink and uplink (DL/UL) control message including the extType field, the mcScaleReMask field, and the mcScaleOffset field, and the extLen field; and transmit, to a receiver, the DL/UL control message.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4A illustrates an example DL/UL control message according to embodiments of the present disclosure;

FIG. 4B illustrates another example DL/UL control message according to embodiments of the present disclosure;

FIG. 6 illustrates an example channel characteristic according to embodiments of the present disclosure;

FIG. 7 illustrates an example channel combination according to embodiments of the present disclosure;

FIG. 9A illustrates an example DL/UL control message according to embodiments of the present disclosure;

DETAILED DESCRIPTION

Figure 1:
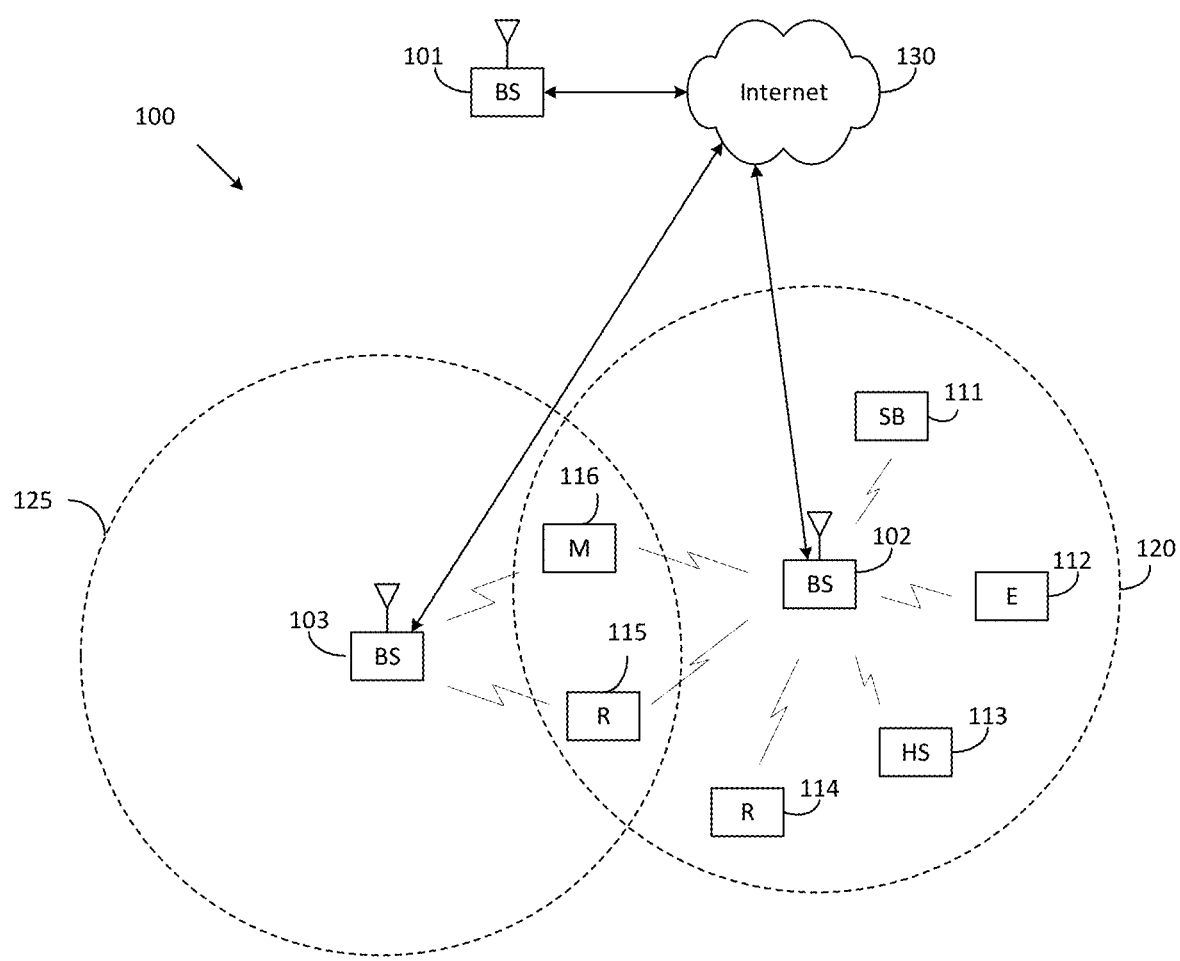
FIG. 1 illustrates an example wireless network according to embodiments of the present disclosure.

FIG. 1 through FIG. 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: "XRAN-FH.CUS.0-v02.01," xRAN Fronthaul Working Group, Control, User and Synchronization Plane Specification; and "ORAN-WG4.CUS.0-v01.00," O-RAN Fronthaul Working Group, Control, User and Synchronization Plane Specification.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both frequency division duplexing (FDD) and time division duplexing (TDD) are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
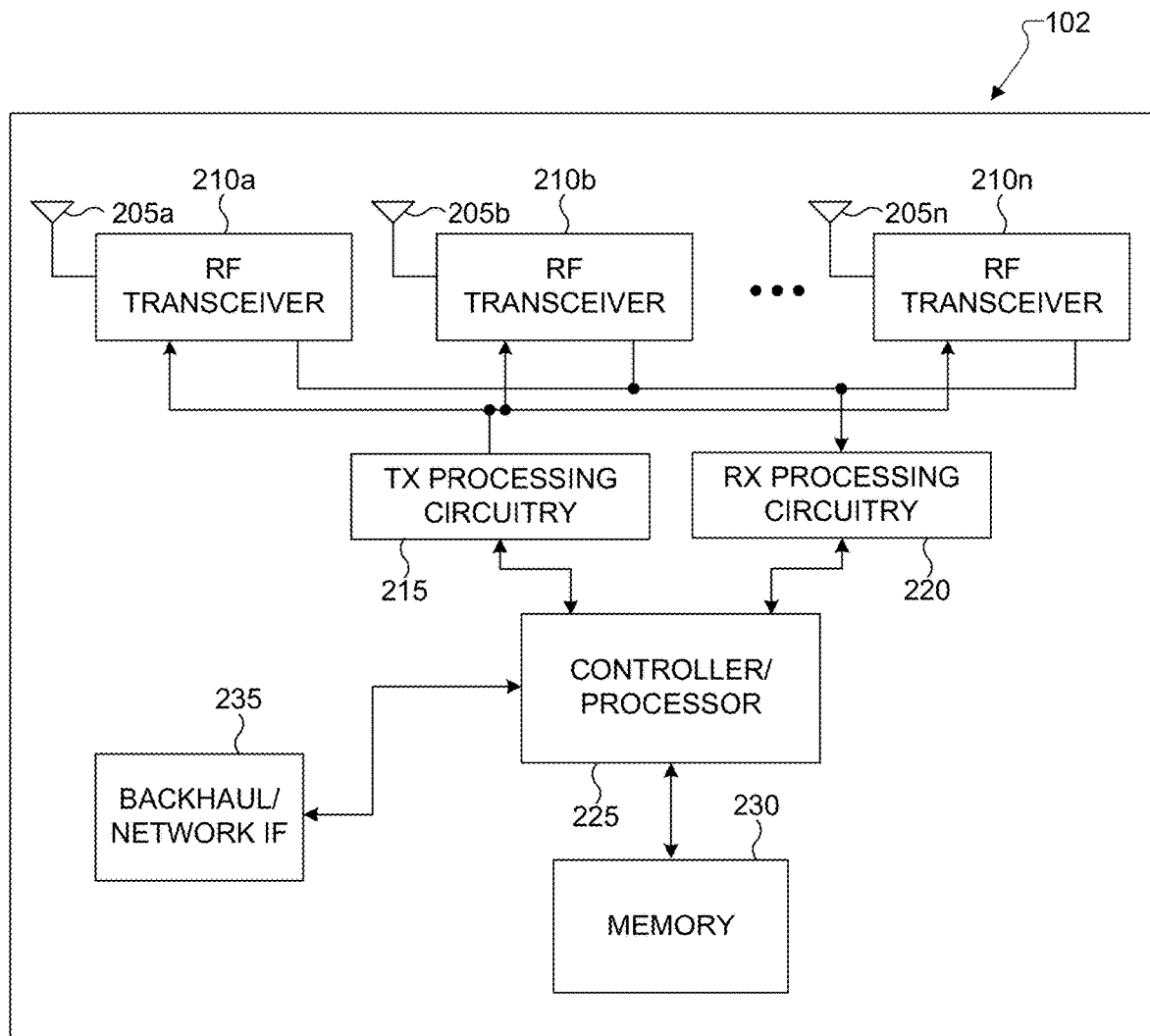
FIG. 2 illustrates an example gNB according to embodiments of the present disclosure.
Figure 3:
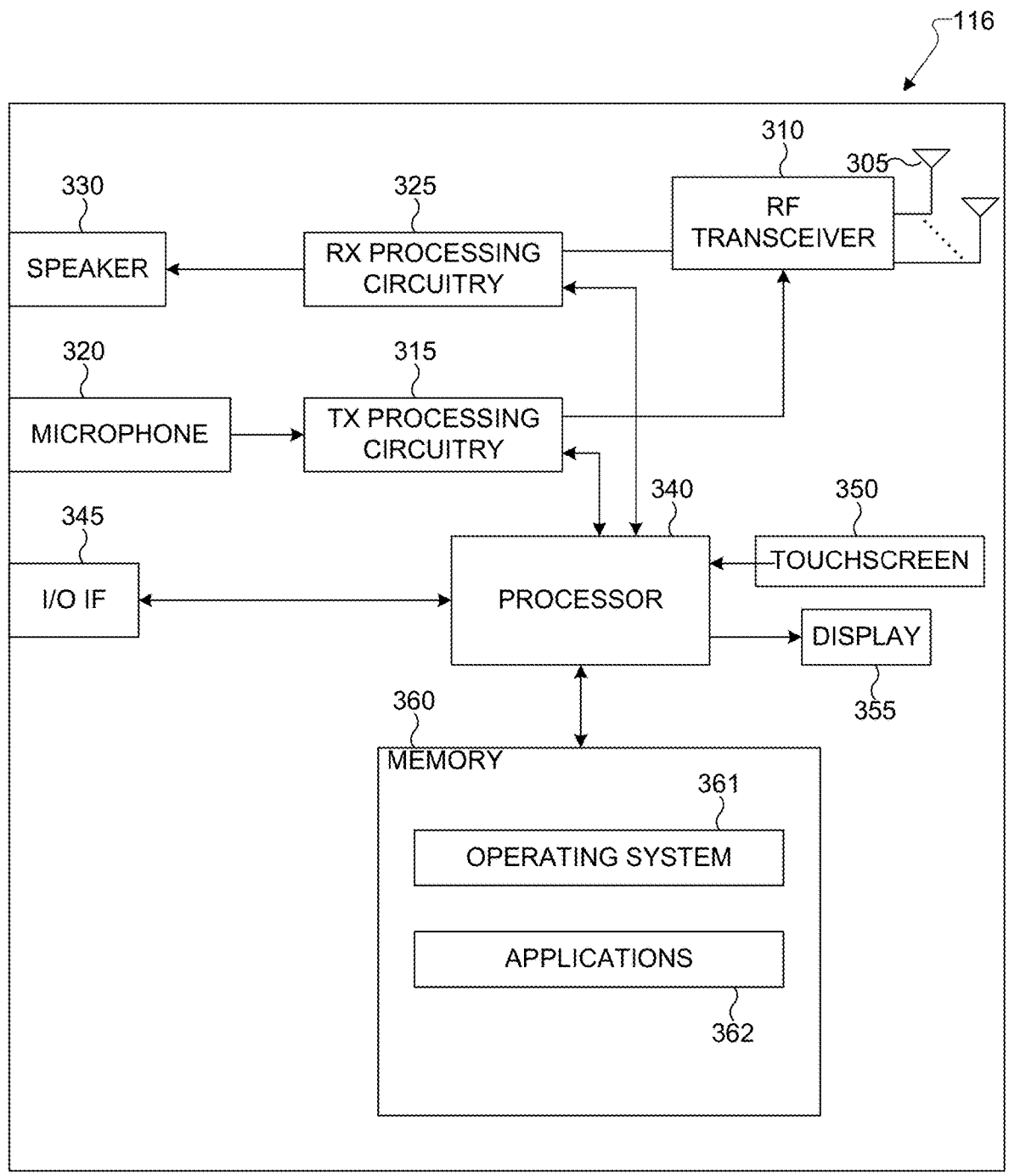
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for efficient signaling of control message for fronthaul interface. In certain embodiments, and one or more of the gNBs 101-103 includes circuitry, programing, or a combination thereof, for CSI acquisition based on space-frequency compression in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNB s come in a wide variety of configurations, and FIG. 2 does not limit the scope of the present disclosure to any particular implementation of a gNB.

As shown in FIG. 2, the gNB 102 includes multiple antennas 205a-205n, multiple radio frequency (RF) transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure provide a new section header which includes a control message, a new extension header which includes a new extension type field, a new position indicator describing the positions of the resources, and a new scalar value associated with those resources indicated using the position indicator and an associated one bit field.

The scalar value can be used, for example, to indicate the power scaling factor and the one bit field can be used to describe whether constellation shifting is to be applied for those resources or not.

The present disclosure provides a new message structure that allows to describe different properties such as power scaling offset for resources grouped into a single section of the control plane message.

The present disclosure provides a scheme to configure as many groups of resources as required within a section which has different properties such as power scaling offset.

The present disclosure provides a scheme to group resources within different modulation orders to be grouped under one section.

FIG. 4A illustrates an example DL/UL control message 400 according to embodiments of the present disclosure. The embodiment of the DL/UL control message 400 illustrated in FIG. 4A is for illustration only. FIG. 4A does not limit the scope of the present disclosure to any particular implementation.

FIG. 4B illustrates another example DL/UL control message 450 according to embodiments of the present disclosure. The embodiment of the DL-UL control message 450 illustrated in FIG. 4B is for illustration only. FIG. 4B does not limit the scope of the present disclosure to any particular implementation.

As illustrated in FIGS. 4a and 4B, the downlink/uplink (DL/UL) message includes a position indicator (power scale re-masking and multicarrier scale re-masking "pwrScaleRe-Mask"/"mcScaleReMask" as illustrated in FIG. 4B) and a new scalar value (pwrScaleOffsert as illustrated in FIG. 4B) along with a one-bit field (csf).

The present disclosure provides a scheme for grouping REs with different modulation orders in one section of the control plane message.

In one embodiment, as illustrated in FIG. 4B, the DL/UL message 450 includes an extension type (e.g., "extType") field, a pwrScaleReMask field (e.g., mcScaleReMask), a power scale offset (e.g., "PwrScaleOffset/"mcSCaleOffset") field, and an extension length (e.g., "extLen") field.

In such embodiment, the extType fields may indicate a new section extension that is used when different power scaling needs to be applied for different resource elements (Res) indicated in re-masking (e.g., "reMsk") of section header. In one example, the reMsk of section header includes a value of 5.

In such embodiment, the pwrScaleReMask (e.g., mcScaleReMask) field may indicate the REs with the same power scale offset.

In such embodiment, the PwrScaleOffset (e.g., mcSCaleOffset) field may indicate the power offset value. In one example, the PwrScaleOffset (e.g., mcSCaleOffset) field includes a value of 11 bits. In another example, if the value of 11 bits is not available, a size of the bit may be changed to 15 bits and zero padding is applied to match 4 bytes alignment.

In such embodiment, the extLen may indirectly indicate how many a pair of the "pwrScaleReMask (e.g., mcScaleReMask) and pwrScaleOffset (e.g., mcSCaleOffset)" is present in the section extension.

xRAN/O-RAN specification defines the front-haul interface to be described as a set of one or more physical resource blocks (PRBs). In one PRB, one or more several channel data with different power offset may be multiplexed after RE mapping.

Figure 5:
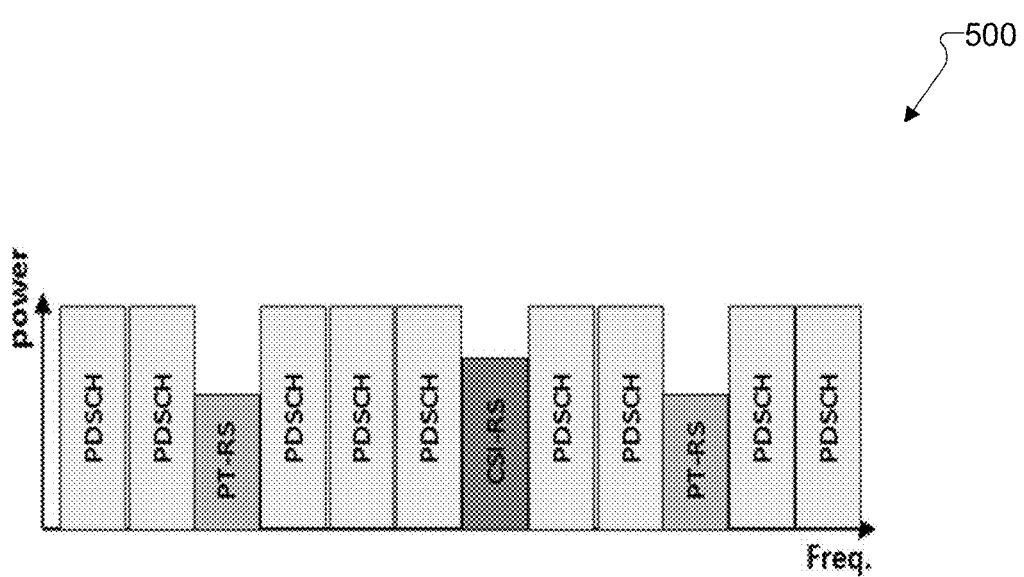
FIG. 5 illustrates an example transmission of some of the DL channels with different power level and possible mapping in frequency resource according to embodiments of the present disclosure.

FIG. 5 illustrates an example transmission of DL channels with different power level and possible mapping in frequency resource 500 according to embodiments of the present disclosure. The embodiment of the transmission of DL channels with different power and possible mapping in frequency resource 500 illustrated in FIG. 5 is for illustration only. FIG. 5 does not limit the scope of the present disclosure to any particular implementation.

As illustrated in FIG. 5, the transmission of DL channels 500 performs a transmission of physical downlink shared channels (PDSCHs) to a user equipment (UE) in a time and frequency domain.

FIG. 6 illustrates an example channel characteristic 600 according to embodiments of the present disclosure. The embodiment of the channel characteristic 600 illustrated in FIG. 6 is for illustration only. FIG. 6 does not limit the scope of the present disclosure to any particular implementation.

As illustrated in FIG. 6, the channel characteristic 600 includes a set of channels such as a physical downlink shared channel (PDSCH), demodulation reference signal _ PDSCH (DMRS_PDSCH), a phase tracking-reference signal (PT-RS), a channel state information-reference signal (CSI-RS), a physical downlink control channel (PDCCH), a DMRS_PDCCH, a primary synchronization signal (PSS), a secondary synchronization signal (SSS), and a physical broadcast channel (PBCH). As illustrated in FIG. 6, the set of channels includes power offset, respectively, along with a proper modulation scheme.

FIG. 7 illustrates an example channel combination 700 according to embodiments of the present disclosure. The embodiment of the channel combination 700 illustrated in FIG. 7 is for illustration only. FIG. 7 does not limit the scope of the present disclosure to any particular implementation.

As illustrated in FIG. 7, a channel combination based on the channels identified in FIG. 6 is determined.

As illustrated in FIG. 6 and FIG. 7, various possible combinations of data channels may be mapped to one PRB. As illustrated in FIG. 6 and FIG. 7, control signaling messages define sections to describe at least one such PRB.

In one embodiment, a modulation compression is one of the compression schemes specified in the xRAN/O-RAN specification.

In conventional system, a message structure for a modulation compression does not allow specifying different power levels of a channels mapped to single PRB and a message structure also does not allow channels with different modulation order also to be specified.

In one embodiment, it is provided that an extension header includes one or more sets of new section extension type, a new position indicator (pwrScaleReMask/mcScaleReMask in the figure) and, a new scalar value (pwrScaleOffsert) along with one-bit field (csf).

In one embodiment, resources with the same power can be grouped using a position indicator and associated power offset value can be indicated using the scalar value. Also, the constellation shift flag can be associated with the group of resources which allows grouping of resources with different modulation order together into one section.

Figure 8:
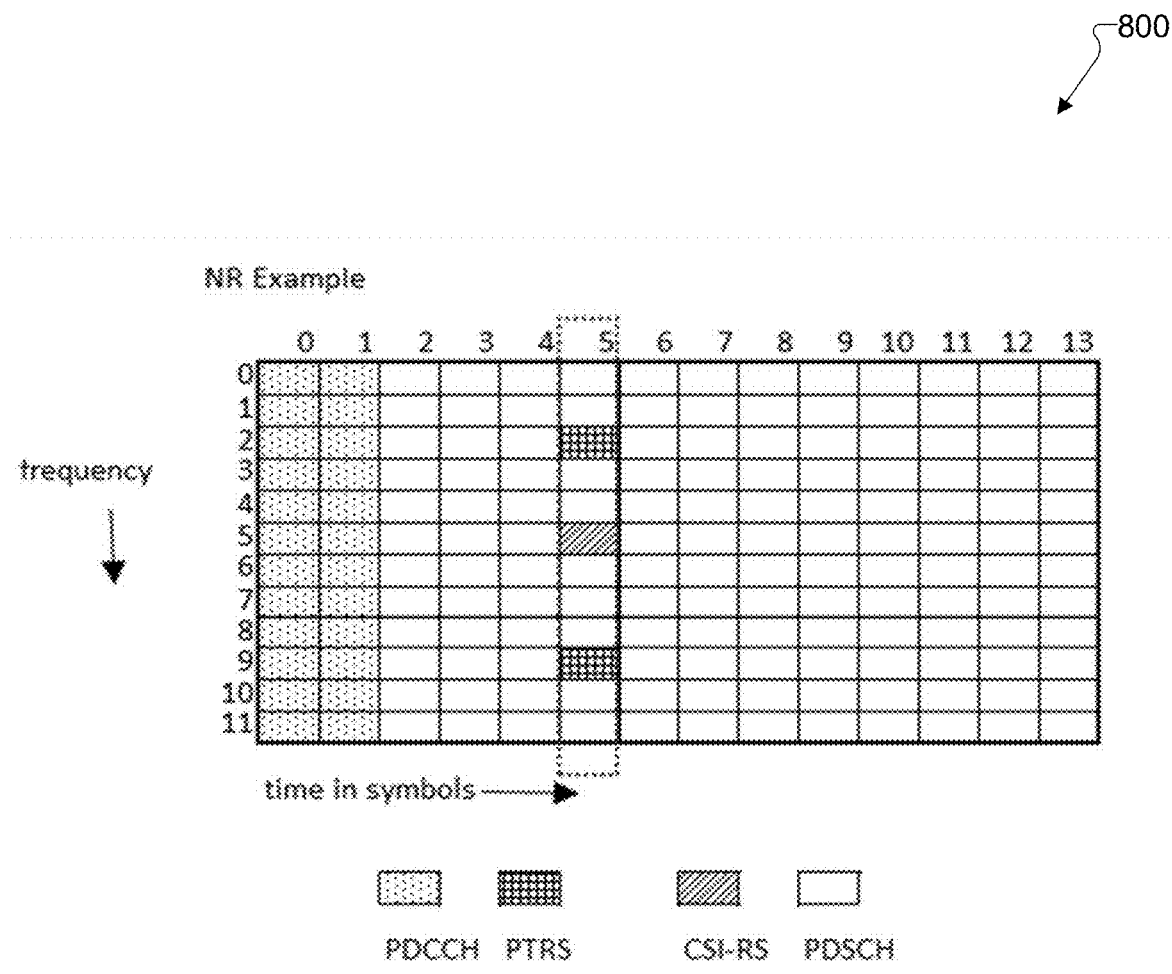
FIG. 8 illustrates an example resource allocation according to embodiments of the present disclosure.

FIG. 8 illustrates an example resource allocation 800 according to embodiments of the present disclosure. The embodiment of the resource allocation 800 illustrated in FIG. 8 is for illustration only. FIG. 8 does not limit the scope of the present disclosure to any particular implementation.

As illustrated in FIG. 8, a usage of new section extension is provided with a symbol number 5. As illustrated in FIG. 8, assuming that symbol 5 can be scheduled using same beam id, all resources within the symbol 5 is determined using one section in the control plane message.

Figure 9B:
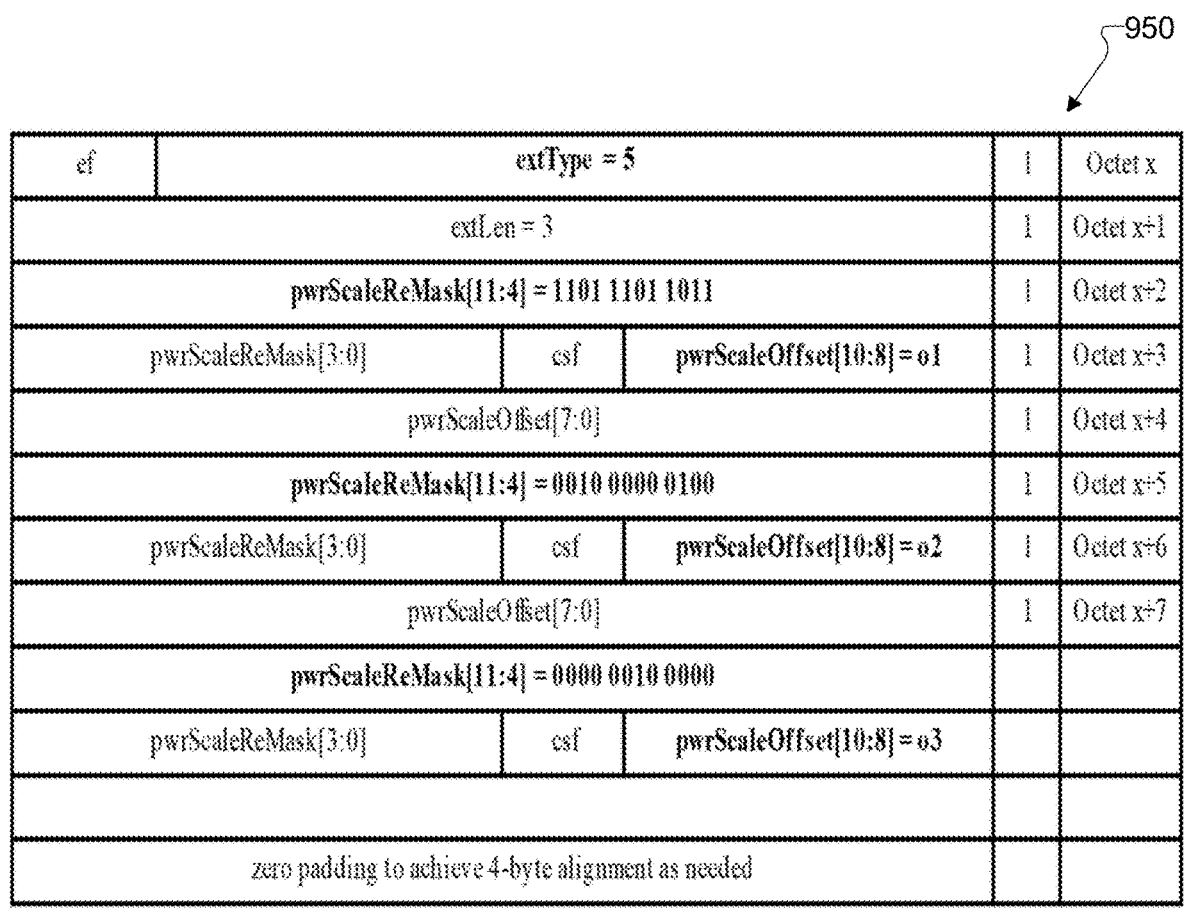
FIG. 9B illustrates another example DL/UL control message according to embodiments of the present disclosure.

If the power needs to be scaled differently for each of the channels (i.e. physical downlink shared channel (PDSCH) with o1, phase tracking reference signal (PTRS) with o2, and channel state information-reference signal (CSI-RS)

with o3), then the newly provided section extension header can be used as shown in FIGS. 9A and 9B.

FIG. 9A illustrates an example DL/UL control message 900 according to embodiments of the present disclosure. The embodiment of the DL/UL control message 900 illustrated in FIG. 9A is for illustration only. FIG. 9A does not limit the scope of the present disclosure to any particular implementation.

As illustrated in FIG. 9A, the DL/UL control message includes symbol 5 in time axis (e.g., PDSCH+CSI-RS+PTRS). Beam Id "b1" is used to send all 3 channels. It is defined that power offset for PDSCH=o1, power offset for PTRS=o2, power offset for CSI-RS=o3. Note that a C-plane message may contain one section header and one section id since there is only one Beam Id. As illustrated in FIG. 9A, ReMask in main section header=1111 1111 1111.

FIG. 9B illustrates another example DL/UL control message 950 according to embodiments of the present disclosure. The embodiment of the DL/UL control message 950 illustrated in FIG. 9B is for illustration only. FIG. 9B does not limit the scope of the present disclosure to any particular implementation.

As illustrated in FIG. 9B, the DL/UL control message includes a section extension: pwrScaleReMask for PDSCH=1101 1101 1011; pwrScaleReMask for PTRS=0010 0000 0100; and pwrScaleReMask for CSI-RS=0000 0010 0000. In one embodiment, "pwrScaleReMask" as illustrated in FIG. 9B may be interpreted to "mcScaleReMask." In one embodiment, "pwrSacleOffset" as illustrated in FIG. 9B may be interpreted to "mcScaleOffset."

A constellation shift is based on the modulation order. One PRB may have different modulations orders (e.g., CSI-RS, PDSCH, PTRS etc.). A conventional extension header provides a single flag which is not sufficient if REs with multiple modulation order are combined into one section header. Accordingly, it may be problem with a section extension=4 in a conventional system and related specification. Other way to see is that, the section extension 4 can only be used if all REs use same modulation order. In one embodiment, this problem may be solved using the embodiments provided in the present disclosure, for example, a section extension type (=5).

Figure 10:
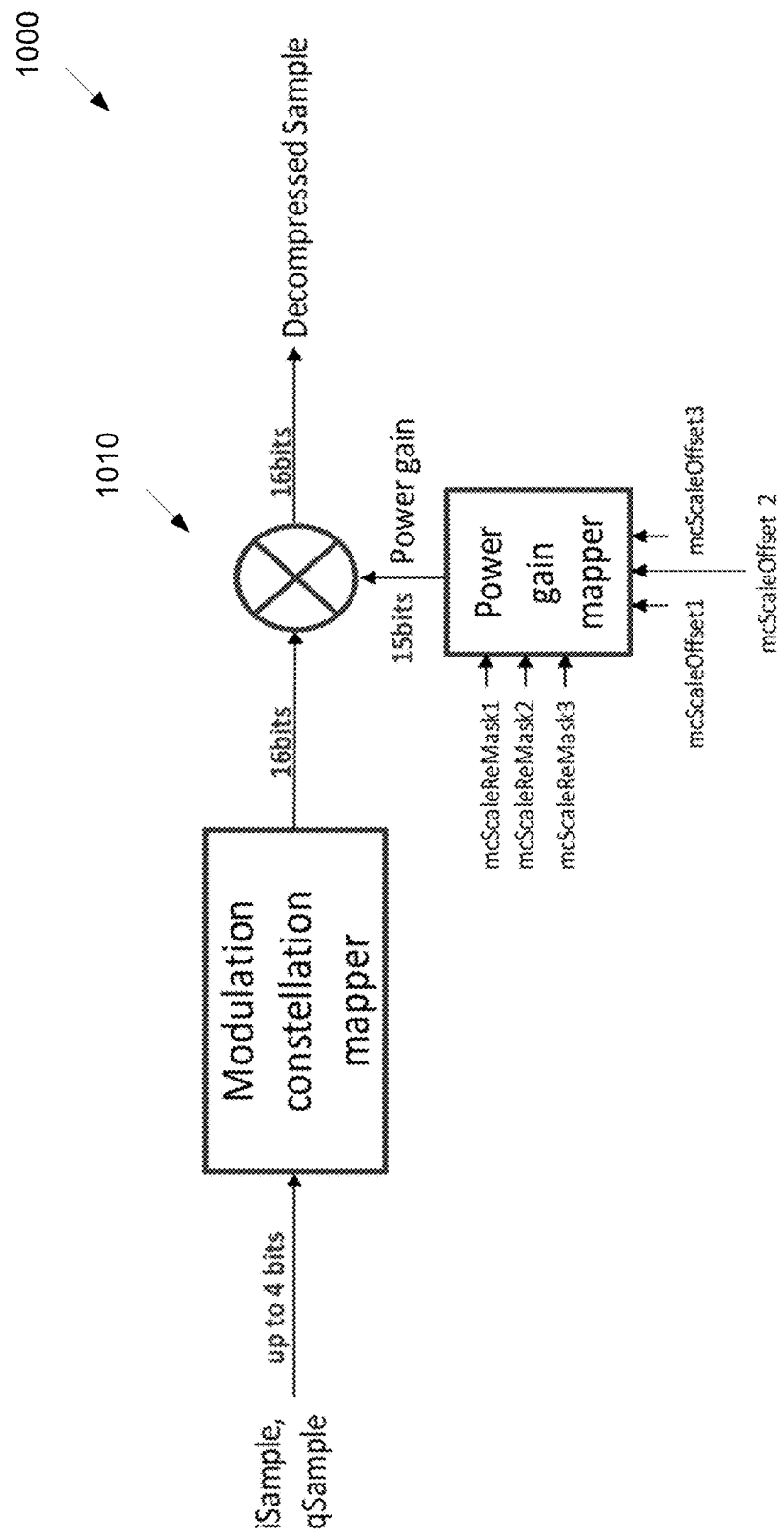
FIG. 10 illustrates an example decompressor 1000 according to embodiments of the present disclosure.

FIG. 10 illustrates an example decompressor 1000 according to embodiments of the present disclosure. The embodiment of the decompressor 1000 illustrated in FIG. 10 is for illustration only. FIG. 10 does not limit the scope of the present disclosure to any particular implementation.

In one embodiment, once the control signaling message is received at the receiver, the receiver can decompress the compressed user data using the logic described in below figure.

As illustrated in FIG. 10, i sample and q sample (e.g., up to 4 bits as illustrated in FIG. 10) are inputted to a modulation constellation mapper 1005. The modulation constellation mapper 1005 transmits an output bit (e.g., 10 bits as illustrated in FIG. 10) to a multiplier 1010. The multiplier 1010 receives a power gain (e.g., 15 bits as illustrated in FIG. 10) from a power gain mapper 1015. The power gain mapper receives a set of mcScaleReMasks (e.g., mcScaleReMask 1, mcScaleReMask 2, and mcScaleReMask 3) and a set of mcScaleOffset (e.g., mcScaleOffset 1, mcScaleOffset 2, and mcScaleOffset 3). The multiplier 1010 outputs a decompressed signal (e.g., 16 bits as illustrated in FIG. 10). In one embodiment, through the present disclose, the set of mcScaleOffset (e.g., mcScaleOffset 1, mcScaleOffset 2, and mcScaleOffset 3) may be interpreted to disclose the set of PwrScaleOffset (e.g., PwrScaleOffset 1, PwrScaleOffset 2, and PwrScaleOffset 3).

In radio unit (RU) side, a decompression can be implemented as follows. In one embodiment, a modulation constellation mapper is the same operation with the conventional modulation decompression. In another embodiment, a modulation compression mapper takes the compressed IQ sample input and maps the IQ value to the bit representation in the radio, example 16 bit is shown below. In yet another embodiment, a power gain mapper uses the mcScaleOffset and corresponding mcScaleReMask parameter and generates power gain value to be used for multiplying the corresponding IQ. In yet another embodiment, an IQ value and the corresponding power gain are multiplied to generate the decompressed IQ sample.

Figure 11:
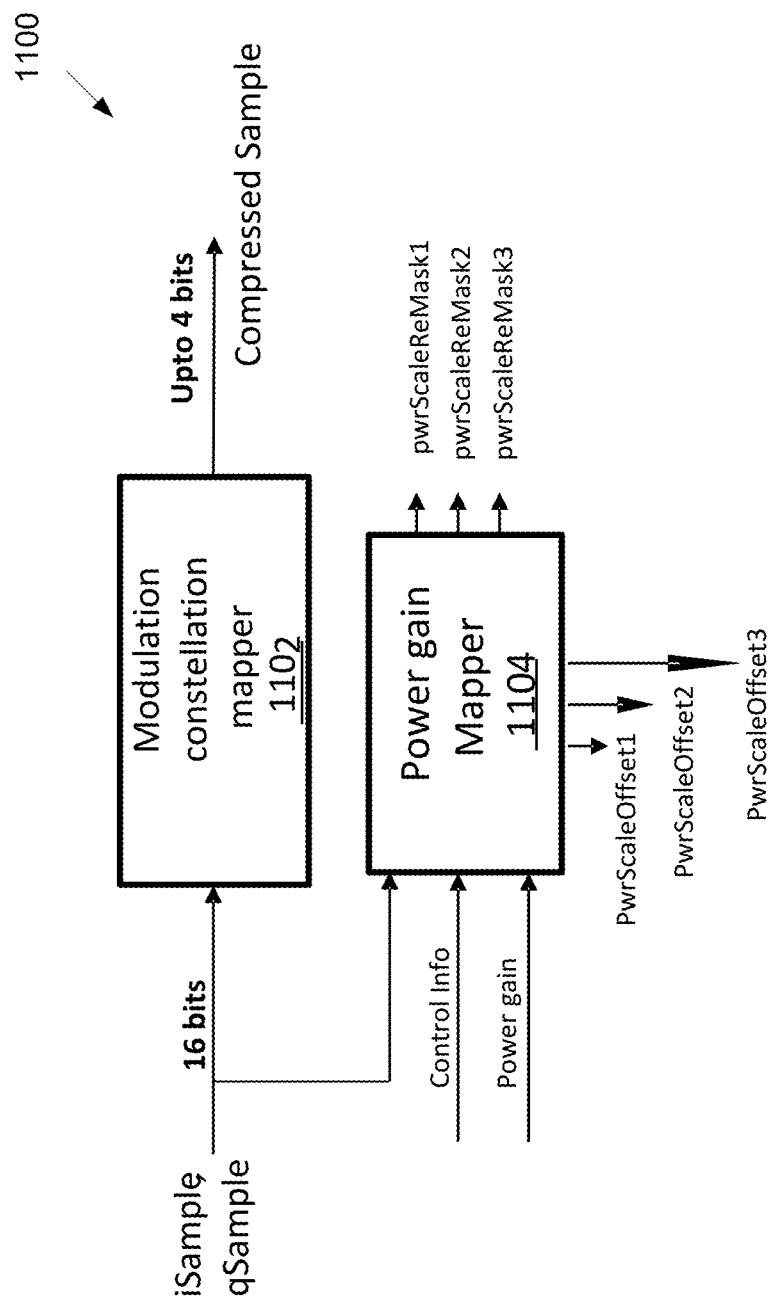
FIG. 11 illustrates an example compressor 1100 according to embodiments of the present disclosure.

FIG. 11 illustrates an example compressor 1100 according to embodiments of the present disclosure. The embodiment of the compressor 1100 illustrated in FIG. 11 is for illustration only. FIG. 11 does not limit the scope of the present disclosure to any particular implementation.

As illustrated in FIG. 11, the compressor 1100 comprises a modulation constellation mapper 1102 and a power gain mapper 1104. The modulation constellation mapper 1102 takes the uncompressed IQ sample input and maps the compressed IQ value. The power gain mapper 1104 generates the PwrScaleOffset (e.g., mcScaleOffset) and corresponding pwrScaleReMask (e.g., mcScaleReMask) parameter based on the control information and the power gain of the corresponding channel mapped to a specific RE in the PRB. The IQ value and the corresponding power gain is multiplied to generate the decompressed IQ sample.

Figure 12:
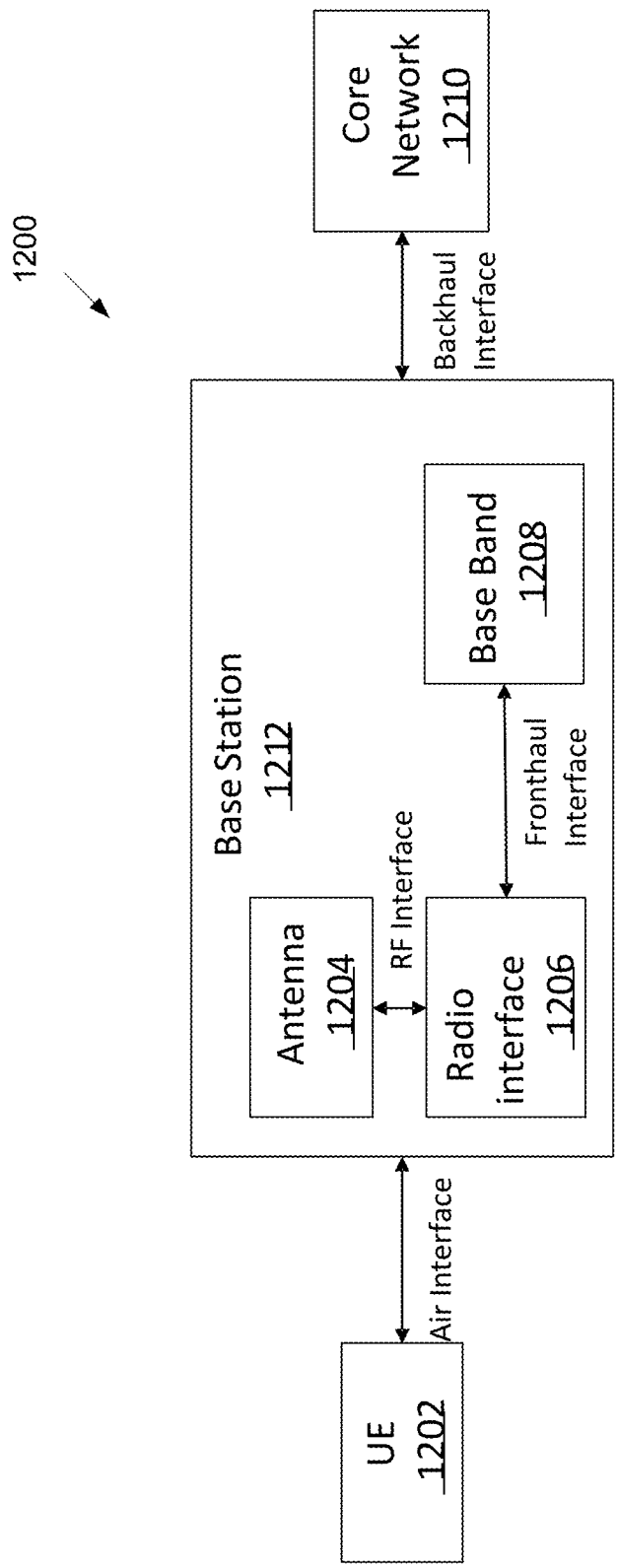
FIG. 12 illustrates an example network architecture according to embodiments of the present disclosure.

FIG. 12 illustrates an example network architecture 1200 according to embodiments of the present disclosure. The embodiment of the network architecture 1200 illustrated in FIG. 12 is for illustration only. FIG. 12 does not limit the scope of the present disclosure to any particular implementation.

As illustrated in FIG. 12, the network architecture 1200 includes a UE 1102 (e.g., 111-111 as illustrated in FIG. 1), a base station (BS) 1212 (e.g., 101-103 as illustrated in FIG. 1), and a core network 1210. The BS 1212 further comprises an antenna 1204, a radio interface 1206, and a base band 1108. The UE 1202 and the BS 1212 are connected via an air interface. The BS 1212 and the core network 1210 are connected via a backhaul interface. The antenna 1204 and the radio interface 1206 are connected via an RF interface, and the radio interface 1206 and the base band 1208 are connected via a fronthaul interface.

A DL/UL control message may be transmitted and received between the radio interface 1206 and the base band 1208. A transmitter device and a receiver device may be implemented in the radio interface 1206 and/or the base bad 1208 in order to transmit and receive the DL/UL control message.

In the current xRAN/O-RAN specification, 5 candidate compression technologies are used to accommodate the efficient fronthaul bandwidth (BW) utilization. Among these candidates, in simple implementation perspective, a block floating is a good candidate. In BW efficiency perspective, modulation compression is highly recommended for DL. The motivation of "Modulation compression" shows the perfect picture to enable the efficient fronthaul BW with the ideal compression performance without any system performance loss. But, considering "Modulation compression," there were some operational defects which should be remedied in the current specification. That is, co-existence of several different data within a PRB, after RE mapping. In addition, "power offset" information for each channel are required to clarification.

Figure 13:
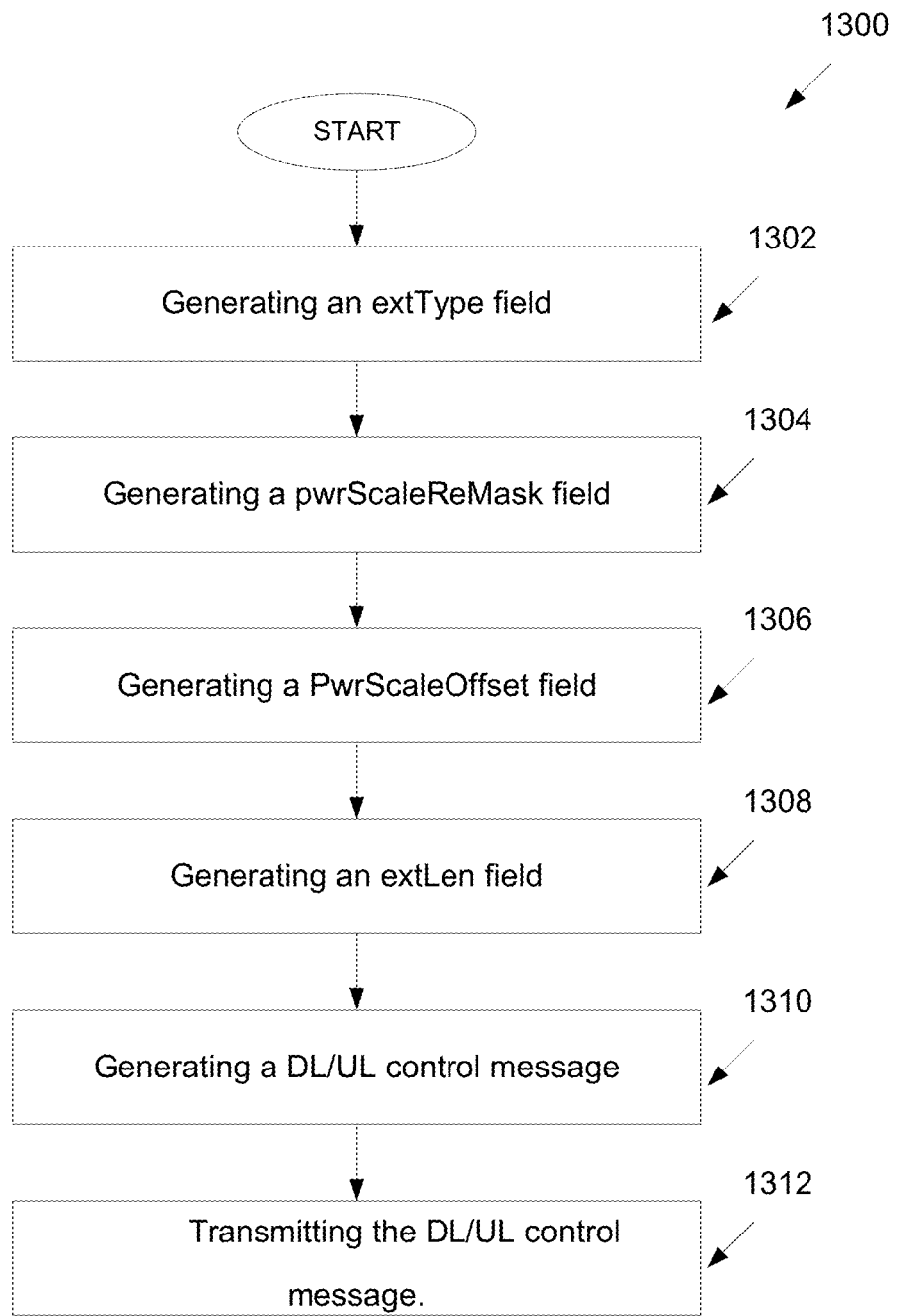
FIG. 13 illustrates a flow chart of a method for control message generation for fronthaul interface according to embodiments of the present disclosure.

FIG. 13 illustrates a flow chart of a method 1300 for control message generation for fronthaul interface according to embodiments of the present disclosure, as may be performed by a transmitter device that may be imbedded in the base station 1212 (e.g., 101-103 as illustrated in FIG. 1). The control message may be transmitted and received between the radio interface 1206 and the base band 1208 as illustrated in FIG. 12. The embodiment of the method 1300 illustrated in FIG. 13 is for illustration only. FIG. 13 does not limit the scope of the present disclosure to any particular implementation.

As illustrated in FIG. 13, the method 1300 begins at step 1302. In step 1302, the transmitter device generates an extType field indicating a section extension.

In one embodiment, the transmitter device identifies the section extension indicating at least one section each of which uses different power scaling, respectively, that is applied for different resource elements (REs), respectively.

Subsequently, in step 1304, the transmitter device generates a mcScaleReMask field indicating a set of resource elements.

Subsequently, in step 1306, the transmitter device generates a mcScaleOffset field indicating a power offset value.

In one embodiment, the transmitter device further identifies the mcScaleOffset field including a value of 11 bits. In one embodiment, the transmitter device further identifies the mcScaleOffset field including a value of 15 bits.

In one embodiment, the transmitter device further identifies the mcScaleOffset field that is filled with a zero padding to match with a 4 bytes alignment.

Subsequently, in step 1308, the transmitter device generates an extLen field indicating a number of a pair of the mcScaleReMask and the mcScaleOffset fields included in the section extension.

Next, in step 1310, the transmitter device generates a downlink and uplink (DL/UL) control message including the extType field, the mcScaleReMask field, and the mcScaleOffset field, and the extLen field.

Finally, in step 1312, the transmitter device transmits, to a receiver, the DL/UL control message.

In one embodiment, the transmitter device further identifies different REs that are indicated in a reMask of section header included in the DL/UL control message.

In one embodiment, the transmitter device further identifies each of the set of REs including a same power scale offset, respectively.

In one embodiment, the transmitter device further compresses user data IQ samples using a modulation constellation mapper and a power gain mapper. In such embodiment, the modulation constellation mapper generates a set of compressed samples corresponding to a set of I samples and a set of Q samples, and the power gain mapper generates a set of mcScaleReMask based on a power gain corresponding to physical resource block (PRB) and a set of mcScaleOffset.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A transmitter device in a wireless communication system, the transmitter device comprising:
   a processor configured to:
      generate an extType field indicating a section extension;
      generate a mcScaleReMask field indicating a set of resource elements;
      generate a mcScaleOffset field indicating a power offset value;
      generate an extLen field indicating a number of a pair of the mcScaleReMask and the mcScaleOffset fields included in the section extension; and
      generate a downlink and uplink (DL/UL) control message including the extType field, the mcScaleReMask field, and the mcScaleOffset field, and the extLen field; and
   a transceiver operably connected to the processor, the transceiver configured to transmit, to a receiver, the DL/UL control message.

2. The transmitter device of claim 1, wherein the processor is further configured to identify the section extension indicating at least one section each of which uses different power scaling, respectively, that is applied for different resource elements (REs), respectively.

3. The transmitter device of claim 1, wherein the processor is further configured to identify different REs that are indicated in a reMask of section header included in the DL/UL control message.

4. The transmitter device of claim 1, wherein the processor is further configured to identify each of the set of REs including a same power scale offset, respectively.

5. The transmitter device of claim 1, wherein the processor is further configured to identify the mcScaleOffset field including a value of 11 bits or a value of 15 bits.

6. The transmitter device of claim 5, wherein the processor is further configured to identify the mcScaleOffset field that is filled with a zero padding to match with a 4 bytes alignment.

7. The transmitter device of claim 1, wherein the processor is further configured to compress user data IQ samples using a modulation constellation mapper and a power gain mapper.

8. The transmitter device of claim 7, wherein the modulation constellation mapper generates a set of compressed samples corresponding to a set of I samples and a set of Q samples, and the power gain mapper generates a set of mcScaleReMasks based on a power gain corresponding to physical resource block (PRB) and a set of mcScaleOffsets.

9. A receiver device in a wireless communication system, the receiver comprising:
   a transceiver configured to receive, from a transmitter, a downlink/uplink (DL/UL) control message DL/UL control message; and
   a processor operably connected to the transceiver, the processor configured to decode the DL/UL control message including an extType field, a mcScaleReMask field, a mcScaleOffset field, and an extLen field,
   wherein:
      the extType field indicates a section extension;
      the mcScaleReMask field indicates a set of resource elements;
      the mcScaleOffset field indicates a power offset value; and the extLen field indicates a number of a pair of the mcScaleReMask and the mcScaleOffset fields included in the section extension.

10. The receiver device of claim 9, wherein the processor is further configured to identify the section extension indicating at least one section each of which uses different power scaling, respectively, that is applied for different resource elements (REs), respectively.

11. The receiver device of claim 9, wherein the processor is further configured to identify different REs that are indicated in a reMask of section header included in the DL/UL control message.

12. The receiver device of claim 9, wherein the processor is further configured to identify each of the set of REs including a same power scale offset, respectively.

13. The receiver device of claim 9, wherein the processor is further configured to identify the mcScaleOffset field including a value of 11 bits or a value of 15 bits.

14. The receiver device of claim 13, wherein the processor is further configured to identify the mcScaleOffset field that is filled with a zero padding to match with a 4 bytes alignment.

15. The receiver device of claim 9, wherein the processor is further configured to decompress compressed user data IQ samples using a modulation constellation mapper and a power gain mapper.

16. The receiver device of claim 15, wherein the modulation constellation mapper generate a set of compressed samples corresponding to a set of I samples and a set of Q samples, and the power gain mapper generates a set of mcScaleReMasks based on a power gain corresponding to physical block (PRB) and a set of mcScaleOffsets.

17. A non-transitory computer-readable medium comprising program code, that when executed by at least one processor, causes a transmitter device in a wireless communication system to:

generate an extType field indicating a section extension;
generate a mcScaleReMask field indicating a set of resource elements;
generate a mcScaleOffset field indicating a power offset value;
generate an extLen field indicating a number of a pair of the mcScaleReMask and the mcScaleOffset fields included in the section extension;
generate a downlink and uplink (DL/UL) control message including the extType field, the mcScaleReMask field, and the mcScaleOffset field, and the extLen field; and
transmit, to a receiver, the DL/UL control message.

18. The computer-readable medium of claim 17, further comprising program code, that when executed by at least one processor, causes the transmitter device to identify the section extension indicating at least one section each of which uses different power scaling, respectively, that is applied for different resource elements (REs), respectively.

19. The computer-readable medium of claim 17, further comprising program code, that when executed by at least one processor, causes the transmitter device to:
identify different REs that are indicated in a reMask of section header included in the DL/UL control message;
identify each of the set of REs including a same power scale offset, respectively;
identify the mcScaleOffset field including a value of 11 bits or a value of 15 bits;
identify the mcScaleOffset field that is filled with a zero padding to match with a 4 bytes alignment; and
compress the DL/UL control message using a modulation constellation mapper and a power gain mapper.

20. The computer-readable medium of claim 19, wherein the modulation constellation mapper generates a set of compressed samples corresponding to a set of I samples and a set of Q samples, and the power gain mapper generates a set of mcScaleReMasks based on a power gain corresponding to physical resource block (PRB) and a set of mcSCaleOffset.

* * * * *